United States Patent
Szedo

(10) Patent No.: US 8,484,267 B1
(45) Date of Patent: Jul. 9, 2013

(54) WEIGHT NORMALIZATION IN HARDWARE WITHOUT A DIVISION OPERATOR

(75) Inventor: Gabor Szedo, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 902 days.

(21) Appl. No.: 12/622,327

(22) Filed: Nov. 19, 2009

(51) Int. Cl.
*G06F 7/00* (2006.01)
*G06F 7/44* (2006.01)

(52) U.S. Cl.
USPC ........... 708/205; 708/209; 708/504; 708/505; 704/224; 704/234

(58) Field of Classification Search
USPC .......................................................... 708/205
See application file for complete search history.

Primary Examiner — Henry Tsai
Assistant Examiner — Dean Phan
(74) *Attorney, Agent, or Firm* — W. Eric Webostad

(57) ABSTRACT

Weight normalization in hardware or software without a division operator is described, using only right bit shift, addition and subtraction operations. A right bit shift is performed on an expected sum to effectively divide the expected sum by two to provide a first updated value for the expected sum. An iteration is performed which includes: incrementing with a first adder a first variable by the first updated value of the expected sum to provide an updated value for the first variable; subtracting with a first subtractor a second weight from a first weight to provide a first updated value for the first weight; and performing a left bit shift on the second weight to effectively multiply the second weight by two to provide a first updated value for the second weight.

20 Claims, 6 Drawing Sheets

$$s = \sum_N w_i x_i$$

FIG. 2A $$\sum_N w_i = 1$$

FIG. 2B $$\sum_N w_i = s_w \neq 1$$

FIG. 2C $$W_i = \frac{w_i}{s_w}$$

FIG. 2D $$N = 2^n$$

FIG. 2E $$\frac{x}{y} = \frac{a}{b}$$

FIG. 2H $$\text{var}_n = \sqrt{\sum_{i=1}^{4} K_{G_{i,n}}^2 - m_{G_n}^2}$$

OR $$\text{SAD}_n = \sum_{i=1}^{4} \left| K_{G_{i,n}} - m_{G_n} \right|$$

$$G_{13} = B_{13} + \sum_{i=1}^{n} W_i \text{avg}_i$$

WEIGHT NORMALIZATION IN HARDWARE WITHOUT A DIVISION OPERATOR

FIELD OF THE INVENTION

The invention relates to integrated circuit devices ("ICs"). More particularly, the invention relates to weight normalization in hardware without a division operator for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects to the hard-coded transistor logic.

For applications involving weight normalization, conventionally division operators were used. However, division operators or divisors may consume a significant amount of circuit resources or budget. Unfortunately, many applications, such as digital signal processing, calculus of probability, Applied Mathematics, audio processing, image processing, and video processing, among others, employ an algorithm that uses a weighted sum operation where weights are normalized. Heretofore, this meant that division operators or divisors were used.

Accordingly, it would be desirable and useful to provide means to perform a weighted sum operation with normalized weights that avoids use of a division operator.

SUMMARY OF THE INVENTION

One or more embodiments generally relate to weight normalization in hardware without a division operator for an IC.

An embodiment relates generally to a method of weight normalization in hardware without a division operator. In this embodiment, an expected sum is obtained. A right bit shift is performed on the expected sum to effectively divide the expected sum by two to provide a first updated value for the expected sum. A first weight and a second weight are obtained. It is determined whether the first weight is greater than the second weight. If the first weight is greater than the second weight, a first iteration is performed. Such first iteration includes: incrementing with a first adder a first variable by the first updated value of the expected sum to provide an updated value for the first variable; subtracting with a first subtractor the second weight from the first weight to provide a first updated value for the first weight; and performing a left bit shift on the second weight to effectively multiply the second weight by two to provide a first updated value for the second weight. A right bit shift is performed on the first updated value of the expected sum to effectively divide the first updated value of the expected sum by two to provide a second updated value for the expected sum.

Another embodiment relates generally to a weight normalizer circuit without a division operator. In this embodiment, for N input ports for N an integer power of 2 greater than 1, a first adder is coupled to receive a first weight and a second weight respectively to a first input port and a second input port of the N input ports and configured to provide a first sum of the first weight and the second weight. A second adder is coupled to receive a third weight and a fourth weight respectively to a third input port and a fourth input port of the N input ports and configured to provide a second sum of the third weight and the fourth weight. A first normalization block is coupled to receive the first sum, the second sum, and a first expected sum. The first normalization block is configured to apportion the first expected sum responsive to the first sum and the second sum to provide a second expected sum and a third expected sum. A second normalization block is coupled to receive the first weight, the second weight, and the second expected sum and configured to apportion the second expected sum responsive to the first weight and the second weight to provide a first normalized weight and a second normalized weight. A third normalization block is coupled to receive the third weight, the fourth weight, and the third expected sum and configured to apportion the third expected sum responsive to the third weight and the fourth weight to provide a third normalized weight and a fourth normalized weight.

Yet another embodiment relates generally to another method of weight normalization without employing a division operator. In this embodiment, a first weight and a second weight are added to provide a first sum of the first weight and the second weight. A third weight and a fourth weight are added to provide a second sum of the third weight and the fourth weight. The first expected sum is first apportioned for normalization by a first normalization block responsive to the first sum and the second sum to provide a second expected sum and a third expected sum. The second expected sum is second apportioned for normalization by a second normalization block responsive to the first weight and the second weight to provide a first normalized weight and a second normalized weight. The third expected sum is third apportioned for normalization by a third normalization block responsive to the third weight and the fourth weight to provide a third normalized weight and a fourth normalized weight. The first normalized weight, the second normalized weight, the third normalized weight, and the fourth normalized weight are output.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 2A through 2H are respective mathematical equations.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
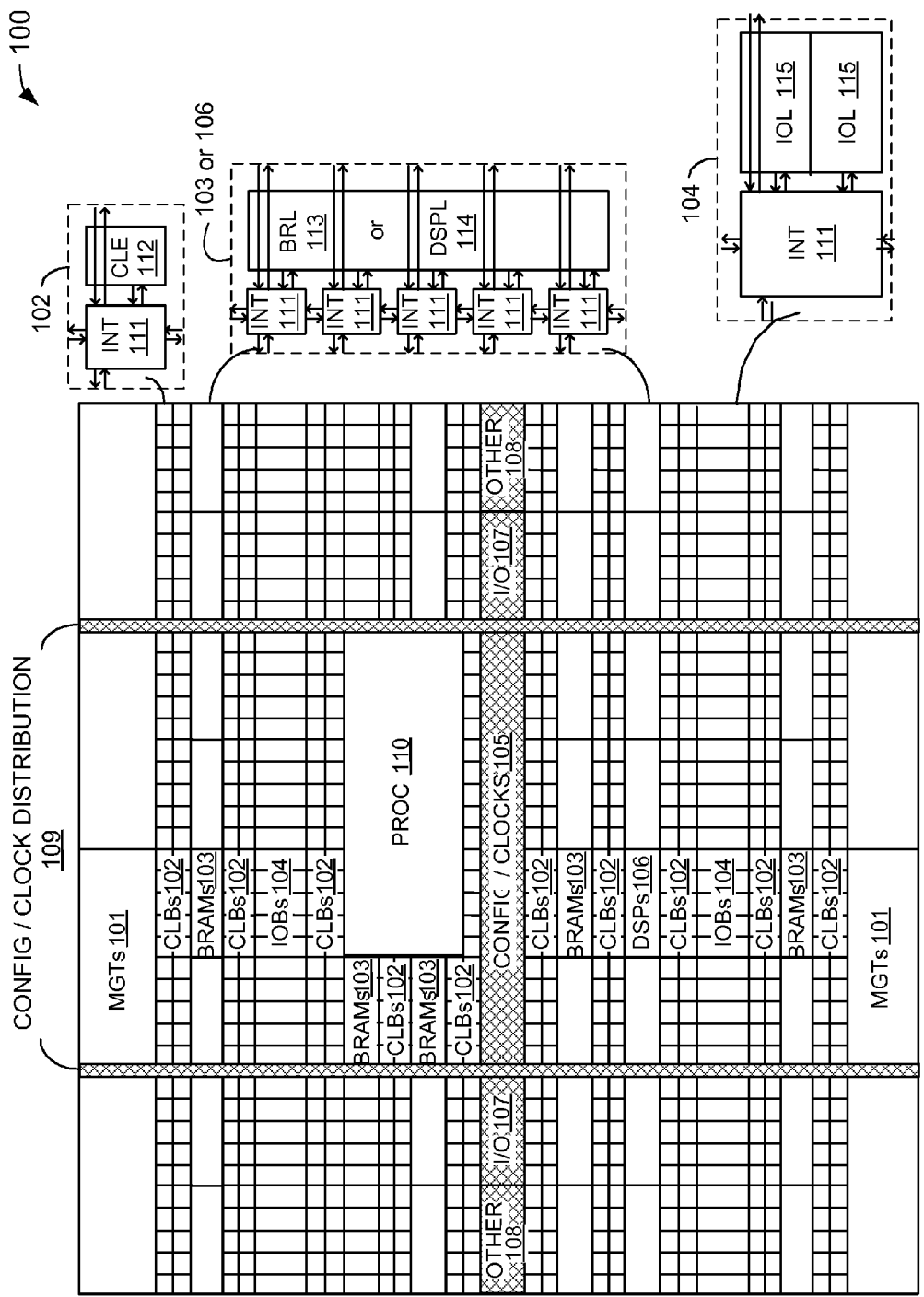
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a horizontal column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

FIGS. 2A through 2H are respective mathematical equations, each of which is described below in additional detail. Various digital signal processing, calculus of probability, audio processing, image processing, and video processing algorithms, among other algorithms, use a weighted sum operation. FIG. 2A is a mathematical expression of a weighted sum "s" for weights $w_i$ and weighting variable $x_i$, where the weights $w_i$ multiplied by the variable, $x_i$, are summed for each i, for i equal to 1 to N, and for N a positive integer greater than one. The weights $w_i$ are thus qualified by the variable $x_i$. In an embodiment, the sum of weights $w_i$ for i from 1 to N is equal to unity, namely 1, as indicated in the equation of FIG. 2B.

However, there are instances where the sum of weights $w_i$ for an application does not equal 1. In those instances, the sum of weights $w_i$ may be expressed as a sum $s_w$ as indicated in the equation of FIG. 2C. If $s_w$ is not equal to one, and $s_w$ is the sum of weights, $w_i$, from 1 to N, then such weights are to be normalized for use, such as in the equation of FIG. 2C.

FIG. 2D is a mathematical expression for normalizing weights, namely where a weight, $w_i$, is divided by the sum of weights, $s_w$, to yield each normalized weight, $W_i$. Thus, $W_i$ is used in equations of FIGS. 2A and 2B instead of $w_i$.

Calculation of normalized weights involves N division operations. Division operators or divisors consume a significant amount of circuit resources, and thus are generally costly. With respect to hardware resources, implementing N division operations may be prohibitively costly, especially with respect to parallel division operations. As described below in additional detail, to avoid such potentially prohibitively costly allocation of hardware resources for such N division operations, weights are normalized by iterative subdivision without a conventional division operator or divisor having to be implemented. For such normalization, it should be understood that for the equations of FIGS. 2A and 2B, not only is $W_i$ used instead of $w_i$, additionally N is set equal to $2^n$, as indicated in the equation of FIG. 2E, where n is a positive integer greater than 0.

Figure 3:
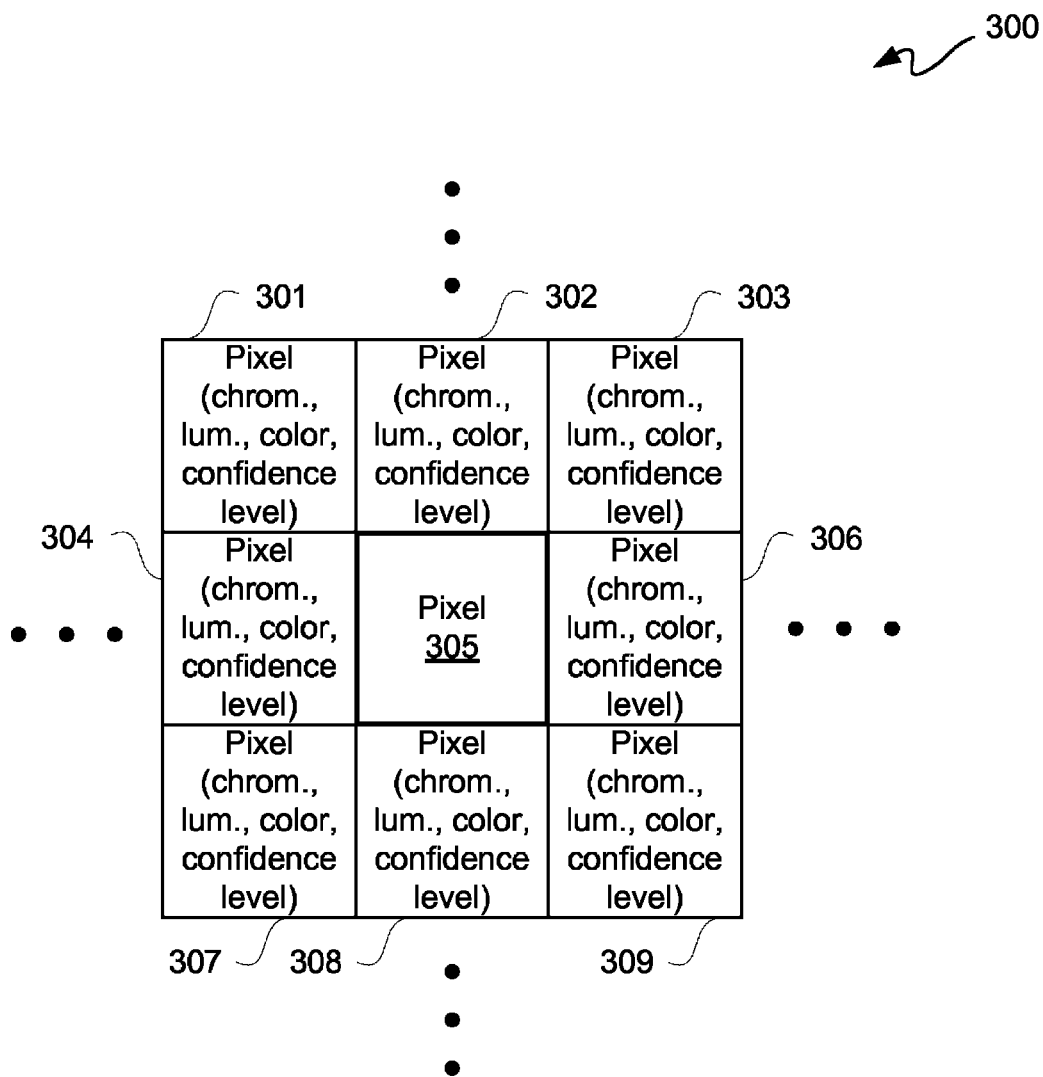
FIG. 3 is a block diagram depicting an exemplary embodiment of an array of pixels, such as for image processing.

FIG. 3 is a block diagram depicting an exemplary embodiment of an array of pixels 300, such as for image processing. Though the example of image processing is used for purposes of clarity and not limitation, it should be understood that other applications of weight normalization may be used.

Array of pixels 300 includes pixels 301 through 309. Pixel 305 has neighboring pixels 301 through 304 and 306 through 309. Each of pixels 301 through 304 and 306 through 309 may have information useful for determining values for pixel 305. For example, each of pixels 301 through 304 and 306 through 309 may have chrominance information, luminance information, and color information. Along with each item of information may be a confidence level associated with such information. This confidence level may be thought of as a weight.

For purposes of clarity by way of example and not limitation, it shall be assumed that the left, right, top, bottom bordering pixels, namely neighboring pixels 302, 304, 306, and 308, are used for determining values for pixel 305. Furthermore, it should be understood that the confidence level or values for pixels 302, 304, 306, and 308 may not all add up to equal one. Thus, for example, for color information, such as cyan value, there may be a number for such cyan value for pixel 302 and a confidence level for that cyan value. Accordingly, the color value is the variable and the confidence level is the weight.

In the above example values for pixels 302, 304, 306, and 308, a normalized value would be determined using the equations described with reference to FIGS. 2A through 2E. To avoid a solution that consumes an excessive amount of resources due to division operators, a more resource efficient implementation is described.

Before providing a more general framework for resource-efficient weight normalization, consider an example where only two weights are to be normalized, namely N is equal to two and n is equal to one with respect to equation of FIG. 2E. Assuming for purposes of clarity that a and b denote the weights to be normalized, and x and y denote corresponding normalized values, then the equality between a, b, x, and y may be set up as indicated in the equation of FIG. 2F. An expected sum, q, of x and y may be expressed as indicated in FIG. 2G. For normalization of two weights, q is equal one, and thus such value may be implemented in the equation of FIG. 2G. However, as described below in additional detail, the weight normalization algorithm as generally depicted with reference to FIG. 4 supports two weights, or any number greater than two weights, for normalization.

Figure 4:
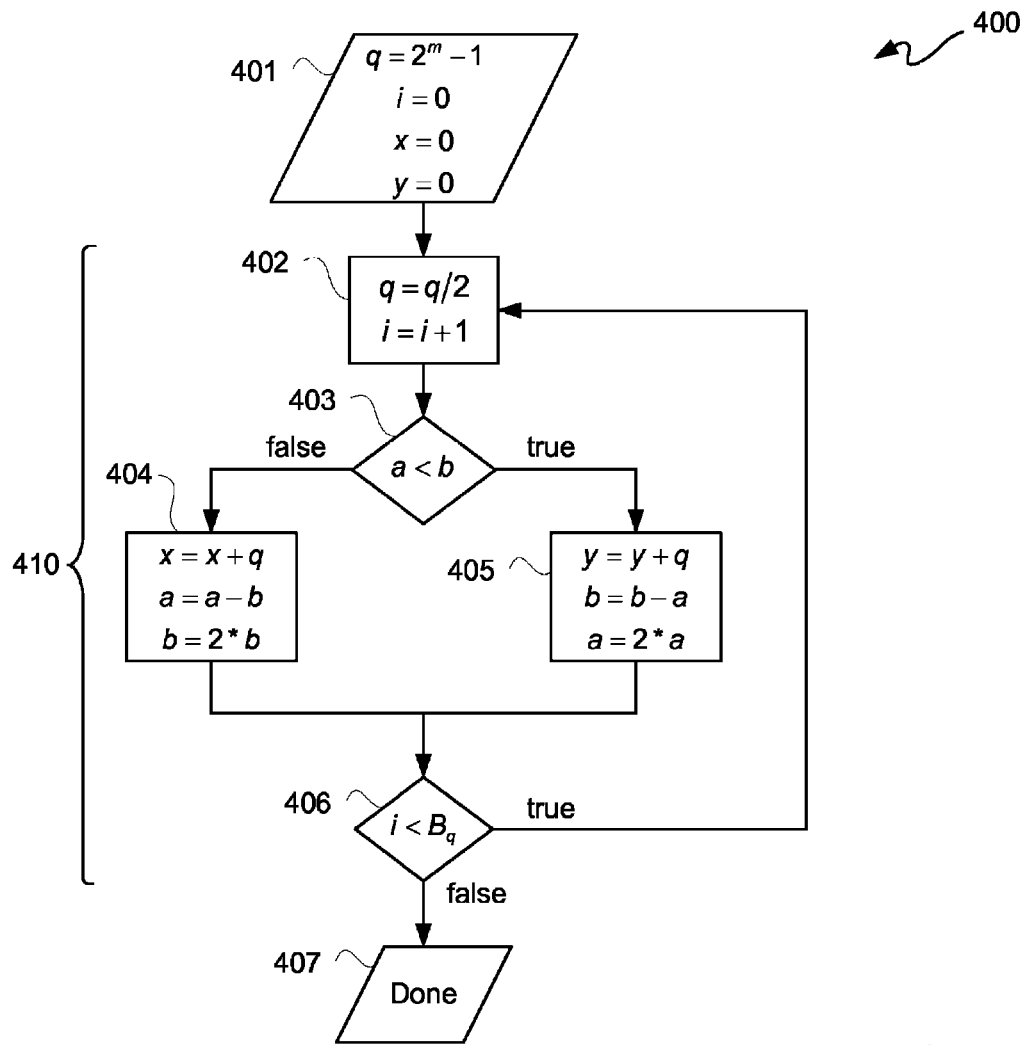
FIG. 4 is a flow diagram depicting an exemplary embodiment of a weight normalization flow.

FIG. 4 is a flow diagram depicting an exemplary embodiment of a weight normalization flow 400. Weight normalization flow 400 in the exemplary embodiment of FIG. 4 is for N equal to two, namely two weights. However, it shall be understood that weight normalization flow 400 may support normalization for any N number of weights, where N is a power of 2, greater than 1 as described herein. However, for purposes of clarity by way of example and not limitation, it shall be assumed that N is equal to two. Furthermore, it should be understood that weight normalization flow 400 may be implemented in hardware or software. In a hardware implementation of weight normalization flow 400, there may be N input ports. With respect to software, a firmware implementation of weight normalization flow 400 may be used. It should further be understood that weight normalization flow 400 avoids divide operations with respect to having to implement a divisor or a divide operator. Accordingly, for microprocessors or other integrated circuits with divide operators or arithmetic logic units (ALU), weight normalization flow 400 may be less attractive. However, many less expensive microprocessors, microcontrollers, and other integrated circuits may not include divide operators or ALUs. Furthermore, many FPGAs, such as FPGA 100 of FIG. 1, do not include divide operators or ALUs. In general, any integrated circuit that does not have a divide operator or divisor is a more suitable target for implementation of weight normalization flow 400.

At 401, variables are initialized. Continuing the above example, i, x, and y are all initialized to zero at 401. Additionally, at 401, an expected value for q may be initialized. Assuming for purposes of clarity by way of example and not limitation, that q is an 8-bit number, then q may be set to $2^m-1$, where m is the number of bits, 8 in this example. In other words, q may be set to 255 in this example. Even though weight normalization flow 400 works on any integer q, numerical resolution may be optimized for q equal or approximately equal to $2^m-1$.

At 402, an initial division of q is implemented. Even though it appears that q is divided at 402 and thus a divisor may be implemented, it should be understood that multiplication or division by two is merely a bit shift of one bit to the left or right, respectively. For such a bit shift, a bit shifter may be used. However, in other embodiments, wire routing may hardwire such a bit shift operation thus avoiding circuit resources associated with a bit shifter. In the context of programmable fabric, programmable routing may be used to implement such a bit shift. Thus, at 402, dividing q by two is a bit shift which may be hardwired to produce a revised or updated value of q for an initial iteration of loop 410. Furthermore, at 402, i is incremented by one, such that the initial iteration of loop 410 for i equal to one. For incrementing i by 1 at 402, an adder may be used with an input thereof tied to a logic 1 and another input for receiving i.

Continuing the above example, assuming weights a and b are to be normalized with two or more iterations of loop 410, it should be appreciated that corresponding normalization values x and y are iteratively calculated with use of loop 410. With each iteration of loop 410, results are progressively refined by a binary digit. Once the values of q reach zero, namely to a least significant bit, such refinement may cease.

Thus, where q is represented as a binary integer, weight normalization flow converges in $B_q$ cycles, where $B_q$ denotes the number of bits used to represent q.

At 403, it may be determined if weight a is less than weight b. For a hardware implementation, a subtractor may be used for the operation at 403, where weights a and b are inputs to such subtractor. If a is less than b, then the right branch of loop 410 is used, namely operations at 405.

Operations at 405 include updating the value of y, namely y is set equal to y+q. For a hardware implementation for the updating of y, an adder may be used and values of y and q may be registered. Furthermore, operations at 405 include updating the value of b, namely b is set equal to b−a. For a hardware implementation for the updating of b, a subtractor may be used and values for a and b may be registered. Lastly, operations at 405 include updating the value of a by multiplying a by 2. Furthermore, for a hardware implementation, the updating of a may be a bit shift to the left, which as previously described may be implemented with a bit shifter or by routing. Again, for an FPGA implementation, programmable routing may be used for such by wiring. Moreover, it should be understood that values for q, y, a, and b are iteration-dependent, as such values change from iteration to iteration of loop 410.

If, however, at 403 it is determined that a is not less than b, then operations at 404, namely the left branch of loop 410, is used. In this branch, x is updated by adding to x the value of q. Furthermore, at 404, a is updated by subtracting from a the value b, and at 404, b is updated by multiplying b by two. Accordingly, it should be understood that operations at 404 and 405 are associated with one another. Accordingly, an adder, subtractor, and a shifter, which may be implemented by wiring, may be used for a hardware implementation of the operations at 404 as similarly described with respect to the operations at 405 and thus not repeated here.

Depending on the resource goals versus performance goals of an implementation, the adder, subtractor, and shifter (wiring) of operations at 404 and 405 may be either the same or parallel instances of one another. Parallel instances of one another may be used for more demanding performance applications. However, where such performance may be relaxed and where resources may be less plentiful, multiplexers may be used to multiplex whether the right or left path is implemented on a cycle or iteration and which and how values are used, and thus only one set of an adder, subtractor, and shifter (wiring) may be implemented as opposed to at least two sets of those circuits for a parallel implementation of operations at 404 and 405.

At 406, it is determined whether i is less than $B_q$. In other words, it is determined whether the number of bits used to represent q is equal to the number of iterations of loop 410. If i is less than $B_q$, then at 402 the then current value of q is once again updated by dividing such current value of q by two, such as by a bit shift as previously described, and at 402 the then current value of i is incremented by one, as previously described. If, however, at 406 i is not less than $B_q$, then weight normalization flow 400 terminates at 407. In a hardware implementation, operations at 403 and 406 may be implemented with respective subtractors or comparators, or some combination thereof.

For purposes of clarity by way of example and not limitation, suppose a is equal to 50 and b is equal to 100. Furthermore, suppose q is equal to 255 for q an 8-bit value. It should be understood that 255 is the value of 128+64+32+16+8+4+2+1, and each of these values generally reflect the value of q for 8 iterations of loop 410. Thus for a equal to 50 and b equal to 100, the ratio of x to y is to be 1-to-2 and the sum of x and y is to equal 255. In order to do this, on a first iteration of loop 410, q which is equal to 255 is divided by two and the resulting q for the next iteration after being truncated is 127; while the resulting y for the next iteration will be updated by 128. The first iteration value of i is 1, and for the initial iteration of loop 410, weight a is less than weight b, so operations at 405 are selected for such iteration. At 405, a value of 127 is added to 0 to update y to equal 127. Furthermore, a value of 100 for b has a value of 50 for a subtracted therefrom such that an updated value of b is 50. The value 50 for a is multiplied by two so an updated value for a is 100. At 406, as i equals 1 and $B_q$ equals eight, another iteration of loop 410 is be performed. On the next iteration at 402, q, now 127, is once again divided by two with truncation for q equal to 63, and i is incremented by 1 so i equals 2. Weight a, which is now 100, and weight b, which is now 50, means that at 403 operations at 404 are selected for a next iteration of loop 410. Continuing the example for a second iteration of loop 410, at 404, x is updated to equal 63, and a is updated to equal 50, and b is updated to equal 100. At 406, for i equal to 2, which is less than 8, another iteration of loop 410 may be used and in this iteration operations at 405 will be selected.

Accordingly, it should be appreciated that left then right or right then left branches of loop 410 are alternately selected for performing either operations at 404 or 405. Thus, it should be understood that operations at 404 and 405 are selected in an alternating sequence for at least two iterations of loop 410. Iterations of loop 410 may be performed until i equals $B_q$, namely until i equals the number of bits used to represent q, or, in the above example, 8. Thus, it should be understood that values for x and y may be determined having a weight ratio, which in the above example is ½, where the sum of x and y is equal to or at least approximately a set value of q, which in the above example is 255. Thus, x and y are normalized weights for an expected sum q. Furthermore, it should be understood that such weight normalization may be implemented without a division operator or divisor.

It should be understood that in iterating using iterations of loop 410, q is effectively distributed into x and y, namely separated into two bins, namely an x bin and a y bin. Furthermore, it should be understood that it does not matter whether the right or left branch is the initial branch of loop 410 taken, because the sum of the subdivisions of q ultimately equals $2^m-1$. Furthermore, the distribution of q into bins x and y, which follow from the relationship of weights a and b, is directly proportional to the ratio of a and b.

It should be understood that a loop, such as loop 410, may be unrolled or rolled out. Thus, circuitry associated with operations 404 and 405 may be implemented in parallel logic blocks representing $B_q$ iterations of loop 410. Generally, rather than a bit serial implementation of loop 410, a parallel implementation of an unrolled loop 410 may be used.

Figure 5:
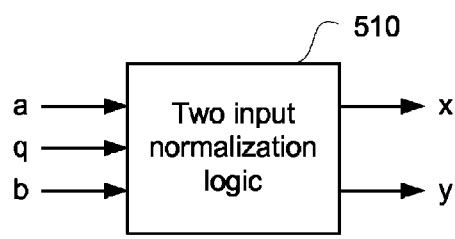
FIG. 5 is a block diagram depicting an exemplary embodiment of a two input normalization logic block.

FIG. 5 is a block diagram depicting an exemplary embodiment of a two input normalization logic block 510. It should be understood that a circuit implementation of weight normalization flow 400 may be used to provide normalization logic block 510. Two input normalization logic block 510 receives weights a and b and an expected sum q and provides corresponding normalized values x and y. Logic for two input normalization logic block 510 may correspond to the above-described logic for implementing operations 402 through 405.

Accordingly, for unrolling or rolling out loop 410, and in particular operations 404 and 405, to represent a number of iterations equivalent to a number of bits used to represent q, block 510 may be used. More particularly, normalization blocks 510 may be cascaded to implement solutions for weights to be normalized, wherein the number of weights to be normalized is greater than two. In other words, normalization blocks 510 may be cascaded for a number of weights for n greater than one, as generally indicated by the equation of FIG. 2E. For n equal to 1, a single normalization block 510 may be used.

Figure 6:
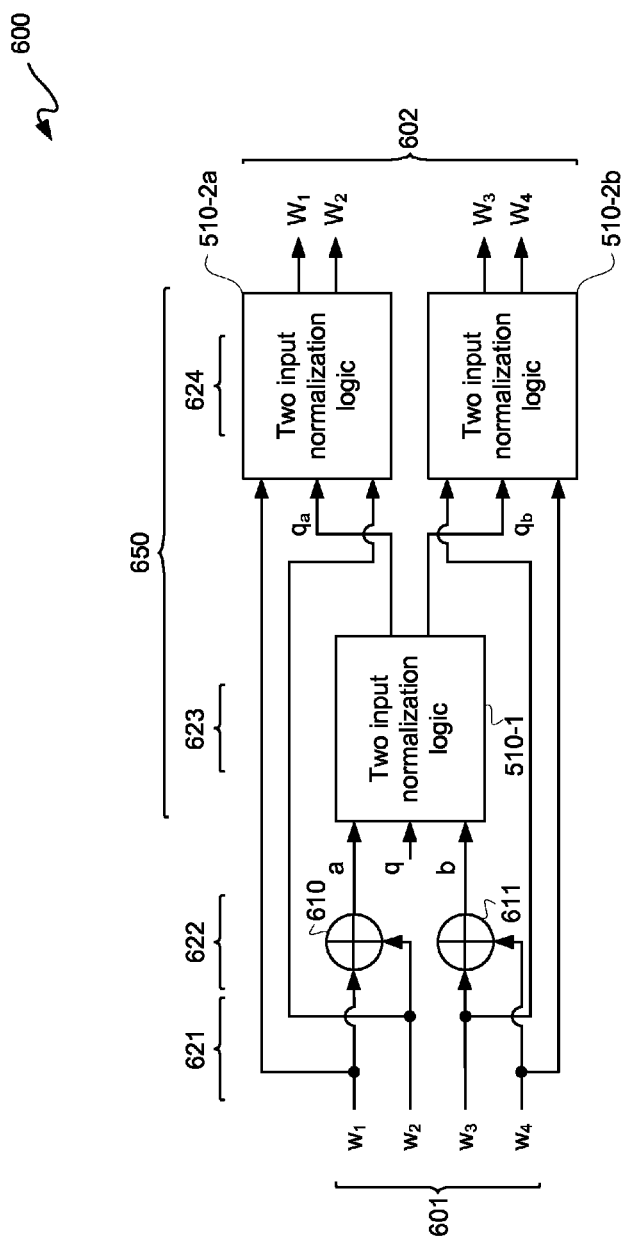
FIG. 6 is a block/flow diagram depicting an exemplary embodiment of a cascade of normalization blocks to provide a weight normalizer.

FIG. 6 is a block/flow diagram depicting an exemplary embodiment of a cascade of normalization blocks 650 to provide a weight normalizer 600 for N equal to four. In other words, there are four weights $w_1$, $w_2$, $w_3$, and $w_4$, namely weights 601. Weights 601 are input to weight normalizer 600, and are split into two groups generally at 621. This initial dividing of weights into two groups may be generalized as a subset of the number of weights N being normalized as mathematically indicated in the equation of FIG. 2H.

Weights $w_1$ and $w_2$ form one group, which may be denoted as $g_a$, and weights $w_3$ and $w_4$ form another group which may be denoted as $g_b$. Generally at 622, the weights in groups $g_a$ and $g_b$ are respectively combined. More particularly, weights $w_1$ and $w_2$ are provided as inputs to adder 610 for combining those weights and the sum of such addition is provided as a weight input a to a normalization block 510-1. Likewise, weights $w_3$ and $w_4$ are provided as inputs to adder 611, and the sum is provided as a weight input b to normalization block 510-1. Thus, the combined weights in each group $g_a$ and $g_b$ are provided as weight inputs a and b to a first stage 623 of weight normalizer 600.

Because this example is for N equal to four, there are only two normalization stages, namely normalization stage 623 and normalization stage 624. However, it should be appreciated from the description herein that more than two stages may be implemented in instances where N is greater than four. Thus, in each subsequent stage of normalization blocks, the number of such normalization blocks is twice the number of the immediately prior stage. As previously indicated, N may be as mathematically expressed in the equation of FIG. 2E.

For an initial stage, namely stage 623, q input to normalization block 510-1 has an initial value of q. For purposes of clarity by way of example and not limitation, suppose q has an initial value of 255 and weights $w_1$, $w_2$, $w_3$, and $w_4$ respectively have values of 1, 2, 3, and 4, then a has a value of 3 and b has a value of 7. Normalization block 510-1, having received combined weights as inputs a and b, effectively divides an expected sum, q, by ratios of a/(a+b) and b/(a+b) to provide $q_a$ and $q_b$ as respective inputs to normalization blocks 510-2a and 510-2b. Continuing the above example, $q_a$ equals 3(255)/10 (i.e., 76 after truncation), and q equals 255−$q_a$ (i.e., 179 after truncation). Again, it should be understood that such calculations are performed without division operators or divisors, as previously described.

Each of normalization blocks 510-2a and 510-2b has an a input, a b input, and a q input. For normalization block 510-2a, the q input receives $q_a$ from normalization block 510-1. For normalization block 510-2b, the q input receives $q_b$ from normalization block 510-1. The a input of normalization block 510-2a receives weight $w_1$, and the b input of normalization block 510-2a receives weight $w_2$. The a input of normalization block 510-2b receives weight $w_3$, and the b input of normalization block 510-2b receives weight $w_4$.

Normalization blocks 510-2a and 510-2b in second normalization stage 624 further subdivide $q_a$ and $q_b$, respectively, according to weights provided to their respective a and b inputs, as previously described. Output of second stage normalization 624 is normalized weights 602. More particularly, output of normalization block 510-2a is normalized weights $W_1$ and $W_2$. Likewise, output of normalization block 510-2b is normalized weights $W_3$ and $W_4$.

Accordingly, weight normalization may be mapped to either parallel or serial hardware implementations as described herein using only comparators and/or subtractors, multiplexers, and adders, as division by two hardware may be implemented with a bit shifter which may be merely wired routing. Such wired routing may be hardwired, as in an ASIC, or programmably configurable routing, as in programmable fabric. Furthermore, in a parallel implementation, such as described with reference to FIG. 6, inputs at each stage including input of weights 601, may be registered, and each register stage may be clocked for purposes of pipelining. Because a parallel implementation as described herein is suitable for pipelining, a pipelined weight normalizer may be implemented in ASICs, FPGAs, or other VLSI circuit as systolic array-like structures capable of operating at relatively high frequencies of operation.

With respect to FPGAs available from Xilinx, Inc., of San Jose, Calif., which have multiple multiplexers in slices of CLBs next to dedicated carry-chain logic circuits, weight normalization, as described for example with reference to FIG. 6, may be implemented in an efficient and compact packing arrangement. Furthermore, weight normalization as described herein may employ less BRAM and/or dedicated multiplier resources of an FPGA than a conventional implementation with division operators, which may be relevant as BRAM and/or dedicated multiplier tend to be less abundant than slice-based logic. Additionally, next to a weighted sum operation, where such weighted sum operation uses multipliers, weight normalization as described herein may be implemented to help balance slice and dedicated multiplier allocations.

Even though a solution for a number of weights as mathematically indicated in the equation of FIG. 2E covers a large set of practical applications, including without limitation normalization of pixel information as described with reference to FIG. 3, such weight normalization is not limited to values as mathematically described in the equation of FIG. 2E. More generally, any arbitrary value of N, where N is an integer larger than 2 may be used. However, generally, for values of N that are not a factor of $2^n$, such algorithms tend to include multiplications and/or divisions by scalars other than two, which may overshadow savings in hardware that result from solutions for numbers of weights in accordance with the mathematical equation of FIG. 2E.

Images imaged on a sensor ("pixel") array may be effectively overlaid with a Color Filter Array ("CFA") and may use digital processing as described below. Each sensor of such sensor array may sample only one of three primary colors. For example, a CFA pattern that samples only one of three primary colors that may be used is a Bayer CFA pattern. Thus, for an RGB Bayer CFA, a first set of sensors may sample only red, a second set of sensors may sample only green, and a third set of sensors may sample only blue. These three sets of sensors form the RGB Bayer CFA.

For implementation of a CFA, weights and normalized weights are determined. For determining normalized weights for an implementation of a CFA, multipliers, such as four multipliers for example, may be used instead of using a more hardware intensive divider.

Figures 7, 8, 9:
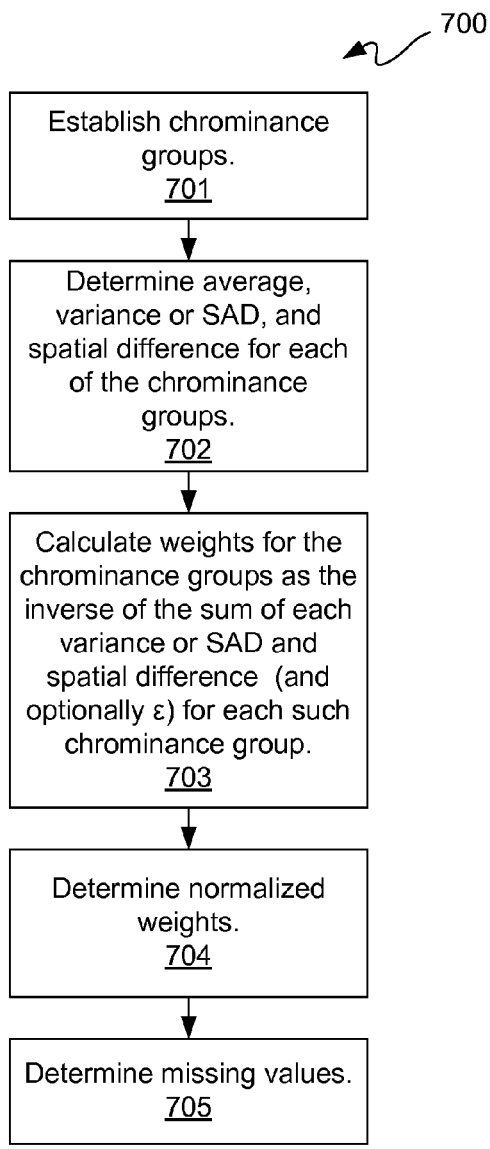
FIG. 7 is a flow diagram depicting an exemplary embodiment of a chrominance variance minimization flow.
FIGS. 8 and 9 are mathematical equations depicting exemplary embodiments of calculations that may be implemented in the flow of FIG. 7.

FIG. 7 is a block diagram depicting an exemplary embodiment of a chrominance variance minimization flow 700. Chrominance variance minimization flow 700 may be for a CFA.

At 701, chrominance groups are established. For example, four chrominance groups may be established at 701. Chrominance is generally calculated as a difference between green and either blue or red channels. Chrominance groups may be established using a sampling matrix, for example a 5-by-5 or other dimensioned sampling matrix.

At 702, an average chrominance, chrominance variance or a sum of absolute differences ("SAD") as described below in additional detail, and spatial difference between sensed color values are determined for each chrominance group. It should be understood that a sampling matrix for a set of color sensors that all sense the same and only one primary color has spatial differences that may be determined among such sensed color values. Chrominance variance within each chrominance group for such sensed color values may be determined as indicated for example in Equation 801 of FIG. 8.

Equation 801 is mathematical expression for a calculation for variance ("$var_n$") of a chrominance group of n chrominance groups for a chrominance, K, and a green, G, color value. In the example of Equation 801, a chrominance, K, and a mean value, m, for a sensed green color value are used. Even though green is used as the primary color sensed for the example, it should be understood that any other primary color may be used. Furthermore, it should be understood that primary colors for image processing are selected from the group consisting of red, green, blue or cyan, magenta, and yellow, as is known. Moreover, it should be understood that the mean value is for the sensed color of a chrominance group for which the variance is to be determined.

Continuing the above example of four chrominance groups and thus i from 1 to 4 sensed color values, a variance for each chrominance group may be determined. In Equation 801, chrominance, K, and mean value, m, are separately squared, and each difference between the squared values is summed for each of the four green color values. Again, it should be understood that even though the example of green is used for purposes of clarity by way of example, it should be understood that other colors may be used. A square root of the total sum of all such differences is obtained to provide the variance of a chrominance group n, where n is any chrominance group, namely group 1, 2, 3, or 4. Thus, a variance may be determined for each chrominance group.

Alternatively, to reduce circuit overhead associated with a square-root operation, a sum of absolute differences ("SAD") may be used as indicated in Equation 802. Equation 802 is similar to Equation 801, except that squaring of chrominance, K, and mean, m, and obtaining a square-root of the total sum of differences are avoided. Rather, in Equation 802, an absolute value of the difference between each chrominance, K, of Equation 801, and a mean value, m, of Equation 801, is summed. Thus, a SAD may be determined for each chrominance group instead of determining a variance. It should be understood that image quality degradation by using SAD instead of variance may not be user-perceptible, and hence SAD may be used to reduce circuit implementation overhead. Once again, even though the example of Equation 802 uses green as the sensed color value, any primary color for image processing may be used.

Returning to FIG. 7, at 703, weights for each of the chrominance groups are calculated. A chrominance weight for a chrominance group may generally be calculated as the inverse of the sum of chrominance variance and spatial difference where chrominance variance and spatial difference are those values determined at 702 for such chrominance group. Alternatively, each variance may be replaced with each associated SAD for such summing with spatial difference and inversion of a total thereof. Optionally, a small value, represented by symbol c may be added as part of the divisor. Such a small value, such as a 1 in an integer system, may be included to prevent division by 0. For example, if both chrominance variance and spatial differences are 0, the sum is 0, which does not have an inverse. That is why a small value may be added in the divisor, so division always returns a real number.

At 704, normalized chrominance weights may be determined for each of the chrominance groups established at 701. Continuing the above example, chrominance weights $w_1$, $w_2$, $w_3$, and $w_4$ may be determined at 703 for four chrominance groups. Such chrominance weights may be input, such as input chrominance weights 601 of FIG. 6. A normalized weight may be mathematically represented as a weight divided by the sum of weights. However, rather than dividing a weight of a chrominance group by a sum of all weights of the four chrominance groups, weight normalizer 600 may be used to produce normalized chrominance weights $W_1$, $W_2$, $W_3$, and $W_4$ corresponding to input chrominance weights $w_1$, $w_2$, $w_3$, and $w_4$ without use of a divider.

At 705, missing values for sampled color samples associated with the chrominance groups may be determined. Measured color sample values from a sensor may be combined by a sum of multiplication results for all chrominance groups, where each multiplication is of a normalized chrominance weight obtained at 704 multiplied by an average chrominance determined at 702 for a chrominance group. Thus, a sum of such multiplications of neighboring values weighed by corresponding chrominance groups may be added to a sensed color value to obtain a missing color value.

For example, in Equation 901 of FIG. 9, a normalized chrominance weight $W_i$, for a chrominance group i, for i of 1, 2, 3, or 4, is multiplied by the average chrominance ("$avg_n$") for such chrominance group. The result of such multiplication is summed with the result of all other multiplications for each remaining chrominance group to determine an offset color value. An offset color value is added to a sensed color value, which in the example of FIG. 9 is a sensed blue ("B") value at array location (1, 3), namely $B_{13}$, to obtain a missing color value at the location. In this example, the missing color value at a location is a green ("G") value at array location (1, 3), namely $G_{13}$. However, it should be understood that (1, 3) may be more generally expressed as (x, y) for any array location of a CFA.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

What is claimed is:

1. A method of weight normalization in hardware without a division operator, comprising:
obtaining an expected sum;
performing a right bit shift on the expected sum to effectively divide the expected sum by two to provide a first updated value for the expected sum;
obtaining a first weight and a second weight;
determining whether the first weight is greater than the second weight;
if the first weight is greater than the second weight, performing a first iteration including:
incrementing with a first adder a first variable by the first updated value of the expected sum to provide an updated value for the first variable;

subtracting with a first subtractor the second weight from the first weight to provide a first updated value for the first weight; and performing a left bit shift on the second weight to effectively multiply the second weight by two to provide a first updated value for the second weight; and performing a right bit shift on the first updated value of the expected sum to effectively divide the first updated value of the expected sum by two to provide a second updated value for the expected sum.

2. The method according to claim 1, further comprising:

if the first updated value for the second weight is greater than the first updated value for the first weight, performing a second iteration including:

incrementing with the first adder or a second adder a second variable by the second updated value of the expected sum to provide an updated value for the second variable;

subtracting with the first subtractor or a second subtractor the first updated value of the first weight from the first updated value of the second weight to provide a second updated value for the second weight; and performing a left bit shift on the first updated value for the first weight to effectively multiply the first updated value of the first weight by two to provide a second updated value for the first weight; and outputting the updated value of the first variable and the updated value of the second variable as normalized values of the first weight and the second weight.

3. The method according to claim 2, further comprising:

initializing the first variable, the second variable, and an increment variable;

incrementing the increment variable by one for the first iteration to provide a first updated value for the increment variable;

incrementing the first updated value of the increment variable by one for the second iteration to provide a second updated value for the increment variable;

first comparing the first updated value of the increment variable to a number of bits value prior to the performing of the second iteration;

the number of bits value being for a number of bits used to represent the expected sum; and second comparing the second updated value of the increment variable to the number of bits value prior to a repeat of the first iteration.

4. The method according to claim 3, further comprising alternately repeating the first iteration and the second iteration with the first comparing and the second comparing alternately interspersed between the first iteration and the second iteration for a number of cycles.

5. The method according to claim 4, wherein:

the first weight and the second weight are weights for respective chrominance groups associated with a color filter array;

the number of cycles is equivalent to the number of bits value;

responsive to either the first updated value or the second updated value of the increment variable being equal to the number of bits value, ceasing the alternately repeating for the outputting the updated value of the first variable and the updated value of the second variable as the normalized values of the first weight and the second weight, wherein the normalized values are for the chrominance groups, and at least one missing color value is determined using at least one of the normalized values.

6. A weight normalizer circuit without a division operator, comprising:

N input ports for N an integer power of 2 greater than 1;

a first adder coupled to receive a first weight and a second weight respectively to a first input port and a second input port of the N input ports and configured to provide a first sum of the first weight and the second weight;

a second adder coupled to receive a third weight and a fourth weight respectively to a third input port and a fourth input port of the N input ports and configured to provide a second sum of the third weight and the fourth weight;

a first normalization block coupled to receive the first sum, the second sum, and a first expected sum;

the first normalization block configured to apportion the first expected sum responsive to the first sum and the second sum to provide a second expected sum and a third expected sum;

a second normalization block coupled to receive the first weight, the second weight, and the second expected sum and configured to apportion the second expected sum responsive to the first weight and the second weight to provide a first normalized weight and a second normalized weight; and a third normalization block coupled to receive the third weight, the fourth weight, and the third expected sum and configured to apportion the third expected sum responsive to the third weight and the fourth weight to provide a third normalized weight and a fourth normalized weight.

7. The weight normalizer circuit according to claim 6, wherein the first normalization block, the second normalization block, and the third normalization block are repeats of a same circuit.

8. The weight normalizer circuit according to claim 7, wherein the first normalization block includes:

a first right bit shift function for effectively dividing the first expected sum by two to provide a first division result as the first expected sum; and a compare function for comparing the first weight and the second weight for multiplexing between a first circuit branch and a second circuit branch, wherein the first circuit branch includes:

a first add function for adding the first division result to a first variable to provide the first variable as the second expected sum;

a first subtract function for subtracting the second weight from the first weight to provide a first subtraction result as the first weight; and a first left bit shift function for effectively multiplying the second weight by two to provide a first multiplication result as the second weight.

9. The weight normalizer circuit according to claim 8, wherein the first normalization block further includes:

a second right bit shift function for effectively dividing the first expected sum by two to provide a second division result as the first expected sum, wherein the second circuit branch includes:

a second add function for adding the second division result to a second variable to provide the second variable as the third expected sum;

a second subtract function for subtracting the first weight from the second weight to provide a second subtraction result as the second weight; and a second left bit shift function for effectively multiplying the first weight by two to provide a second multiplication result as the first weight.

10. The weight normalizer circuit according to claim 8, wherein:
the first normalization block is for a first stage of normalization; and
the second normalization block and the third normalization block are for a second stage of normalization following the first stage of normalization.

11. The weight normalizer circuit according to claim 10, wherein:
the first normalization block, the second normalization block, and the third normalization block are all instantiated using programmable resources;
the programmable resources are used to implement a color filter array including the weight normalizer circuit;
the first weight, the second weight, the third weight, and the fourth weight are weights for respective chrominance groups processed by the color filter array;
the first normalized weight, the second normalized weight, the third normalized weight, and the fourth normalized weight are respectively associated with the chrominance groups; and
the color filter array is configured to determine missing color values using in part the first normalized weight, the second normalized weight, the third normalized weight, and the fourth normalized weight.

12. The weight normalizer circuit according to claim 11, wherein the programmable resources include programmable interconnect points and field programmable logic gates.

13. The weight normalizer circuit according to claim 12, wherein the programmable resources are of a Field Programmable Gate Array.

14. A method of weight normalization without employing a division operator, comprising:
adding a first weight and a second weight to provide a first sum of the first weight and the second weight;
adding a third weight and a fourth weight to provide a second sum of the third weight and the fourth weight;
first apportioning for normalization by a first normalization block the first expected sum responsive to the first sum and the second sum to provide a second expected sum and a third expected sum;
second apportioning for normalization by a second normalization block the second expected sum responsive to the first weight and the second weight to provide a first normalized weight and a second normalized weight;
third apportioning for normalization by a third normalization block the third expected sum responsive to the third weight and the fourth weight to provide a third normalized weight and a fourth normalized weight; and
outputting the first normalized weight, the second normalized weight, the third normalized weight, and the fourth normalized weight.

15. The method according to claim 14, wherein the first apportioning includes:
first right bit shifting for effectively dividing the first expected sum by two to provide a first division result as the first expected sum; and
comparing the first sum and the second sum for multiplexing between a first circuit branch and a second circuit branch,
wherein the multiplexing to the first branch includes:
adding the first division result to a first variable to provide the first variable as the second expected sum;
subtracting the second sum from the first sum to provide a first subtraction result as the first sum; and
first left bit shifting for effectively multiplying the second sum by two to provide a first multiplication result as the second sum.

16. The method according to claim 15, wherein the first apportioning further includes:
second right bit shifting for effectively dividing the first expected sum by two to provide a second division result as the first expected sum,
wherein the multiplexing to the second branch includes:
adding the second division result to a second variable to provide the second variable as the third expected sum;
subtracting the first sum from the second sum to provide a second subtraction result as the second sum; and
a second left bit shifting for effectively multiplying the first sum by two to provide a second multiplication result as the first sum.

17. The method according to claim 16, wherein:
the first normalization block is for a first stage of normalization; and
the second normalization block and the third normalization block are for a second stage of normalization following the first stage of normalization.

18. The method according to claim 16, further comprising instantiating the first normalization block, the second normalization block, and the third normalization block in programmable resources.

19. The method according to claim 18, wherein the first right bit shifting, the second right bit shifting, the first left bit shifting, and the second left bit shifting are all instantiated in the programmable resources using programmable routing for providing wired bit shifts without shift registers.

20. The method according to claim 19, wherein:
the instantiating of the first normalization block, the second normalization block, and the third normalization block using the programmable resources are all repeats of a same circuit at different locations in the programmable resources;
the programmable resources are used to implement a color filter array including the first normalization block, the second normalization block, and the third normalization block;
the first normalized weight, the second normalized weight, the third normalized weight, and the fourth normalized weight are respectively associated with chrominance groups; and
the color filter array is configured to determine missing color values using in part the first normalized weight, the second normalized weight, the third normalized weight, and the fourth normalized weight.

* * * * *